Feb. 4, 1969 K. Q. KELLICUTT 3,425,888
METHOD AND APPARATUS FOR PRODUCING FACED CORRUGATED MATERIALS
Filed Sept. 4, 1964 Sheet 1 of 2

INVENTOR.
K. Q. KELLICUTT
BY R. Hoffman
ATTORNEY

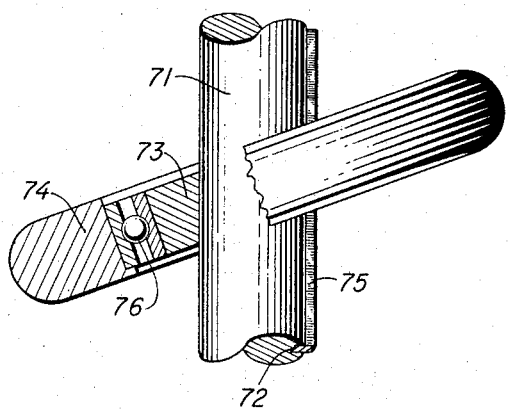
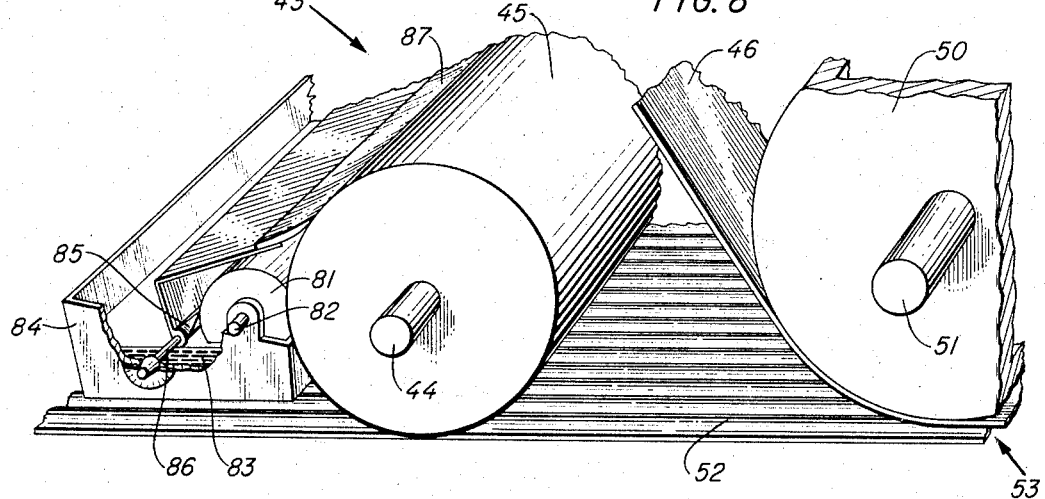
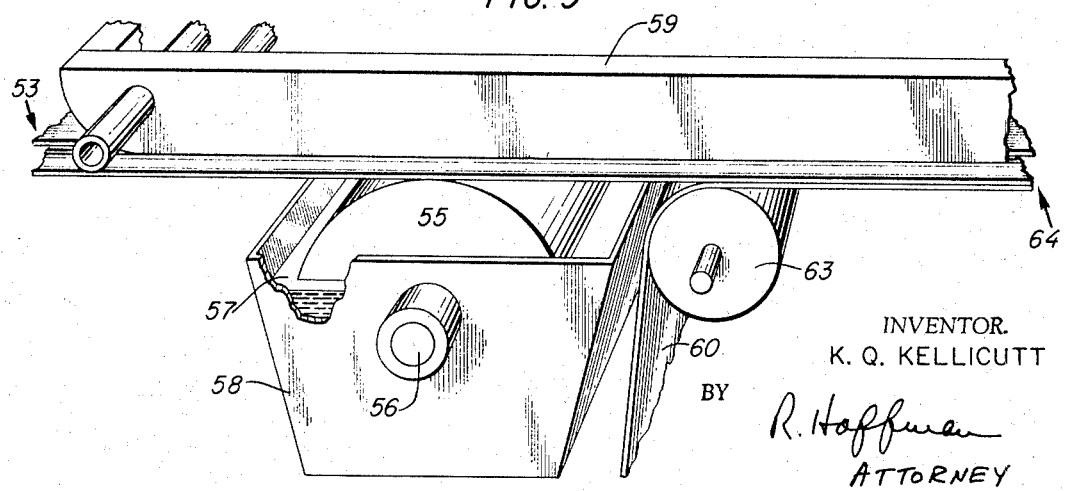

3,425,888
METHOD AND APPARATUS FOR PRODUCING FACED CORRUGATED MATERIALS
Keith Q. Kellicutt, 21 S. Owen Drive,
Madison, Wis. 53705
Filed Sept. 4, 1964, Ser. No. 394,640
U.S. Cl. 156—593                                     1 Claim
Int. Cl. B31f 1/24

ABSTRACT OF THE DISCLOSURE

A method and apparatus are disclosed for producing double faced corrugated materials. The corrugated products are produced by drawing a continuous length of the material to be corrugated between a plurality of wheel rollers and a gathering bed that has a longitudinally converging fluted surface, the amplitude and period of the flutes becoming progressively greater and smaller, respectively.

---

A nonexclusive, irrevocable, royalty-free license in the invention herein described throughout the world for all purposes of the United States Government, with the power to grant sublicenses for such purposes, is hereby granted to the Government of the United States of America.

The invention relates to corrugation and more particularly to a method and apparatus for continuously producing double-faced corrugated materials in a rapid and efficient manner.

Corrugated materials are generally produced by passing a corrugating medium between two mated, laterally grooved corrugating rolls which are heated and maintained in mesh by pressure. The corrugating medium is fluted into configurations that resemble the rolls through which the medium passes. The grinding and pulling action on the corrugating medium may result in stresses that will not be fully relieved upon cooling and drying. The speed of operation may also be limited due to the same strain on the corrugating medium.

The corrugated medium is then provided with adhesive in order to adhere facing material on both sides of the corrugated medium. Generally, this involves placing an adhesive applicator roll against the corrugated medium revolving on one of the laterally grooved corrugating rolls immediately after corrugation, such that adhesive is applied to the ridges on one side of the corrugated medium. In order to hold the corrugated material against the corrugator roll, stationary "fingers," or narrow, curved members are rigidly held in contact with the corrugated medium on a line perpendicular to the corrugations therein. The adhesive applicator roll, revolving on the surface of the corrugating medium, is provided with narrow grooves to accommodate and coincide with said fingers. The presence of the aforesaid fingers may cause "finger lines" or narrow strips across the corrugated material which are void of adhesive, thus resulting in a potential weakness in the double face board. Another method of adhering facing material to the corrugated medium resides in applying adhesive over the entire area of the facing sheet. More adhesive is used in this method than is necessary, thus making the operation uneconomical.

A facing sheet is then applied onto the corrugated medium to produce a single face board, which is conveyed to an overhead bridge where it may accumulate in a pleated pattern, and is then passed over an adhesive applicator whereby adhesive is applied from beneath. Another facing sheet is then applied, resulting in a double face board.

If paper is used to produce the resulting double faced board, the aforementioned corrugating process results in corrugation across the fiber direction of the sheet, i.e., perpendicular to the length of the roll of paper stock.

An object of this invention is to provide a rapid and efficient corrugating process which results in as nearly a stress free corrugation as possible.

Another object of this invention is to provide means to allow the corrugations to run in the with-machine direction of all three component sheets of structural material, i.e., corrugations parallel to the fiber of the paper, if paper is used.

The foregoing objects are achieved by means of a curved, tapered, gathering bed over which flexible material is drawn under tension to produce flute configurations identical in size to those at the narrow end of the tapered bed resulting in corrugations which run parallel to the edges of the corrugated material and in the operational direction of the machine.

Another object of this invention is to provide a means by which facing materials may be adhered concurrently to both the top and bottom of the corrugated sheet in a continuous process.

A further object of this invention is to provide a means to alleviate the pressure on the corrugated medium as adhesive and facing sheet is applied to the first side on the ridges of the corrugated sheet.

A still further object of this invention is to provide a more economical method of applying adhesive to corrugated sheets in a continuous process whereby less adhesive is used to adhere the facing sheet to the corrugated sheet.

An even further object of this invention resides in the provision of means to eliminate the aforesaid "finger lines" in double face corrugated board.

The essence of this invention which renders it possible to achieve the aforegoing objects resides in the provision of corrugated material conveyed between glue laden rolling means and an indeformable, identically corrugated surface, whereby adhesive is applied in a narrow band along the ridges of the corrugated material.

The foregoing and other objects which will become apparent to those skilled in the art will appear in the detailed description and in connection with the accompanying drawings wherein.

Figure 2:
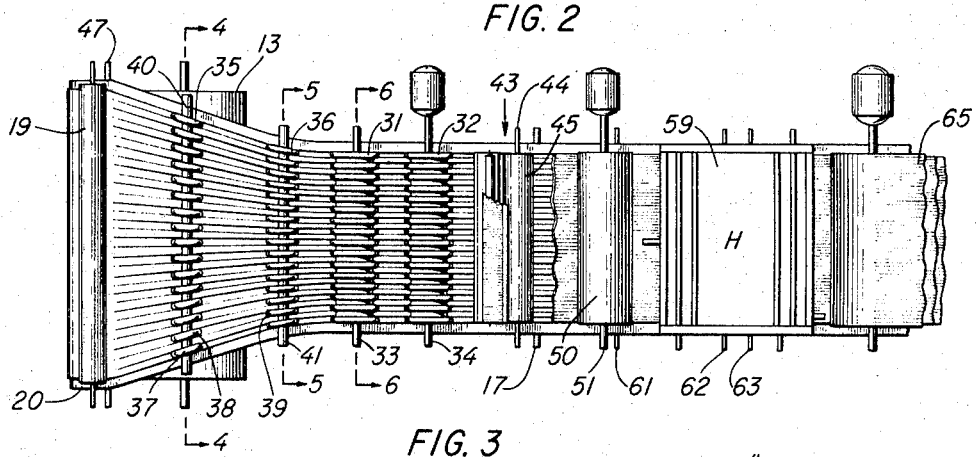
FIG. 2 is a plan view of a portion of the same apparatus in FIG. 1.
Figure 4:
Figure 5:
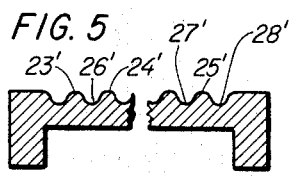
Figure 6:
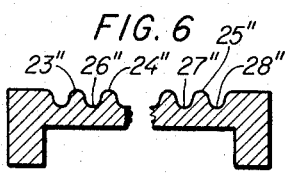

FIG. 4, 5, and 6 are sectional views of the same bed through lines 4, 5, and 6 respectively in FIG. 2;

FIG. 7 is a detailed partial sectional perspective view of a portion of the wheel roller described herein;

FIG. 8 is a detailed perspective view of the top adhesive applicator assembly which may be employed in the practice of the presently described invention; and FIG. 9 is a detailed perspective view of the bottom adhesive applicator assembly which may be employed in the practice of the presently described invention.

Figure 1:
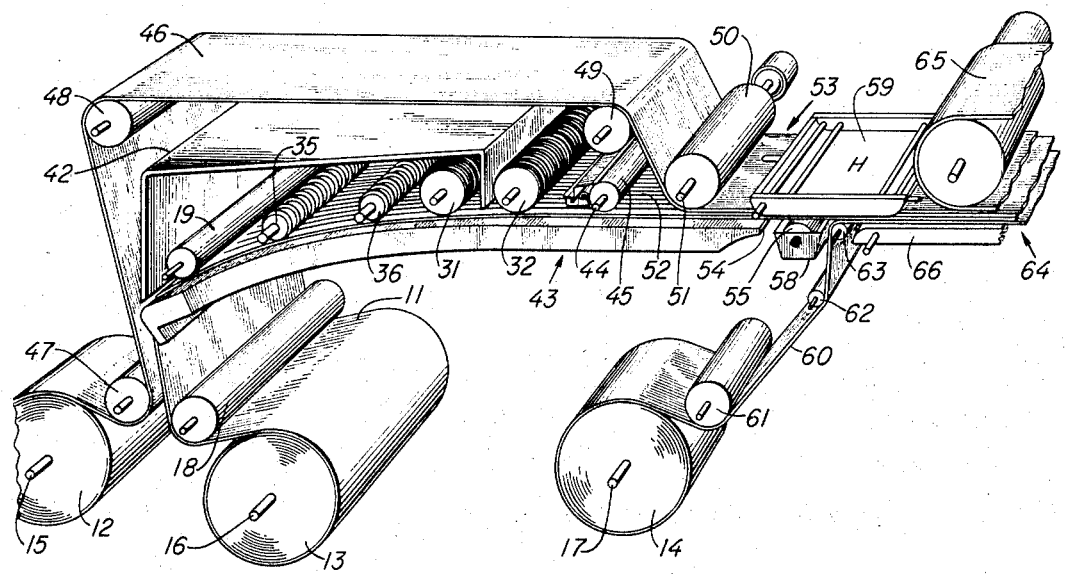
FIG. 1 is a perspective view of the corrugating and facing apparatus which may be employed in the practice of the presently described invention.

Referring particularly to FIGURES 1 and 2, material 11 to be corrugated, such as paper, is provided and prepared in a suitable manner. For example, if paper is used, rolls of paper, 12, 13, and 14 are rotatably mounted on shafts 15, 16, and 17, the material 11 to be corrugated is passed over a heated roll 18, the end of the material being cut into a V shape to facilitate threading, and is introduced between a roll 19, which may be driven, and the laterally flat portion 20 of the gathering bed.

Figure 3:
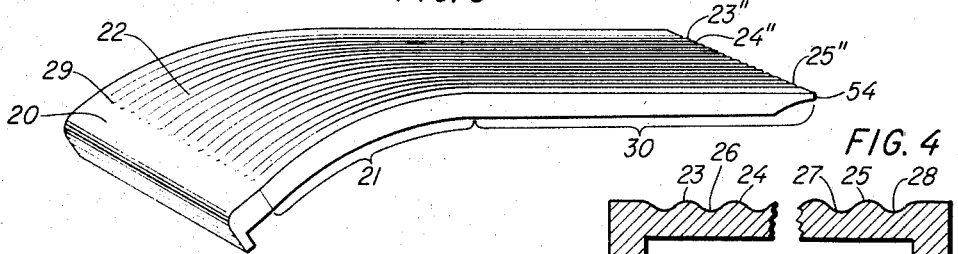
FIG. 3 is a perspective view of the bed portion of this invention.

The gathering bed, as shown in FIGS. 1, 2, and 3 is longitudinally curved along its surfaces and consists of three portions, each portion thereof being continuous with the next. The aforementioned laterally flat portion 20 is continuous with a tapered portion 21, the surface 22 of said tapered portion being provided thereon with flutes, or alternate ridges and grooves, of which ridges 23, 24, and 25, and grooves 26, 27, and 28 are representative, said flutes converging from the end 29 of said laterally flat portion 20 into a parallelly fluted portion 30.

As shown in FIGS. 3, 4. 5, and 6, the amplitude of the aforesaid flutes on the surface 22 of the tapered portion, of which the height of ridges 23, 24, and 25, and the depth of grooves 26, 27, and 28 are representative, increases progressively in the direction of a sheet moving thereon from a very small quantity at 29 to a uniform maximum at the beginning of the parallelly fluted portion 30, while the period of said flutes, of which the distance between the ridges 23, 24, and 25, and grooves 26, 27, and 28 are representative, decreases in the direction of a sheet moving thereon. It will be understood that the pitch of the flutes and the distance between them will depend on the desired final shape of the material to be corrugated.

As shown in FIGS. 1 and 2, the material 11 to be corrugated is drawn over the gathering bed and held firmly thereon by one or more heated rolls 31 and 32, mounted on shafts 33 and 34 respectively, of which shaft 34 is coupled to driving means, said rolls and shafts being located over the parallelly fluted portion 30 of the gathering bed and grooved complementally to coincide with the gathering bed whereby better gripping is attained. The gathering bed is held stationary and is constructed from an indeformable material which may be coated with a substance to produce the least friction, depending on the nature of the material to be corrugated.

The material 11 is drawn over the surface of the tapered portion 22 of the gathering bed by the aforementioned roll 32 and held thereon in contact by a plurality of pressure rolling means, such as the wheel rollers 35 and 36, the wheels thereof, of which 37, 38, and 39 are representative, being of substantially the same diameter and thickness, mounted rotatably on shafts 40 and 41 respectively, and disposed thereon such that said wheels lie in the grooves, of which grooves 26, 27, and 28 are representative, of said gathering bed and are orientated in the direction thereof.

A possible construction of the aforesaid wheel rollers is illustrated in FIG. 7. An essentially straight shaft 71 is provided thereon with a groove 72 parallel to the axis of said shaft. A bushing 73 is disposed on said shaft on an angle thereto such that the axis of revolution of a wheel 74 mounted thereon is perpendicular to the direction of the groove in which said wheel lies. Said bushing is prevented from rotating by a key passing through the opening created by the groove 72 in said shaft and a coinciding groove in said bushing (not shown). Said wheel 74 and said bushing are rotatably attached and are separated by a plurality of bearings, of which 76 is representative.

As the material 11 is drawn over the longitudinally curved gathering bed, said material thereon gradually acquires a fluted configuration. The combination of the longitudinal curve in the gathering bed, as shown in FIGS. 1 and 3, and the gradually elevated ridges and deepened grooves, as shown in FIGS. 4, 5, and 6, tend to propagate an inequality of stress in longitudinal sectors of the corrugatable material, said stress being relieved by the concurrent gathering of said material accomplished by the convergence of the flutes which are gradually and progressively formed in said material.

Material 11 is heated and moistened by a steam-filled enclosure or conditioner hood 42, shown with a side removed, surrounding at least part of the tapered portion 21 of the gathering bed, said bed itself being heated at various points or over the entire surface by stream circulating within or by heaters located thereunder (not shown).

The fluted material moving on the gathering bed has substantially attained its final configuration in the parallelly fluted portion 30 of the bed and passes between said portion and an adhesive applicator roll 43, rotatably mounted on a horizontally adjustable shaft 44, the surface 45 of said roll being continuously provided thereon with adhesive, which is carried around the surface 45 of the adhesive applicator roll 43 and applied to the crests of the corrugated material, said material moving on and being supported by the parallelly fluted portion 30 of the bed.

Referring to FIG. 8, which shows one embodiment of the adhesive applicator assembly, adhesive 83 is provided across the surface 45 of the adhesive applicator roll 43 by means of a secondary applicator roll 81, rotatably mounted on a horizontally and vertically adjustable shaft 82, said applicator rolls being located adjacent to one another with their respective axes being parallel, said secondary applicator roll 81 being partially immersed in adhesive 83 held in a container 84 and rotating therein. The amount of adhesive supplied to the surface 45 of said applicator roll is regulated by varying the distance between the two said rolls and by providing said secondary applicator roll 81 with a metering blade 85, fixedly disposed on an adjustable shaft 86, said metering blade 85 extending across the surface of said secondary applicator roll 81 at a distance therefrom which is regulated by the adjustment of said shaft 82. In order to remove excess adhesive which has not been applied to the corrugated material, a scraper blade 87 is fixedly disposed on an adjustable shaft 86, said scraper blade extending across the surface of said adhesive applicator roll 45 at a distance which is regulated by the adjustment of said shaft. Separate shafts (not shown) may be provided for the metering blade 82 and the scraper blade 87.

Referring again to FIGS. 1, 2, and 8, top facing material 46 is provided over idler rolls 47 and 48 and is heated by passing said material over a heated roll 49. The top facing material 46 is introduced between a pressure roll 50, mounted on a shaft 51 coupled to driving means, and the adhesive-laden corrugated material 52 moving on the parallelly fluted portion 30 of the bed, to produce a single face board.

Referring now to FIGS. 1, 2, and 9, the single face board 53 passes off the end of the parallelly fluted portion at 54 and onto means for applying adhesive to the bottom corrugated surface, such as roll 55 revolving on a shaft 56, said roll being partially immersed in adhesive 57 held in a container 58. During the bottom adhesive application, the upper surface of the single face board 53 is heated by a heater 59.

Bottom facing 60 which has previously been heated by passing it over a heated roll 61 is then introduced over idler roll 62 and between the roll 63 and the adhesive-laden bottom corrugated surface (not shown). Pressure is then applied to the entire double faced board 64 by passing said board between a web belt 65 and a smooth surface 66 which is heated from beneath. The web belt 65 also serves to pull the material through the adhesive applicator assemblies and facers.

It will be seen from the above description of the invention that a rapid and unique method of creating longitudinal corrugations has been achieved, along with a unique manner for conveniently applying adhesive to the top surface of the corrugated material in a continuous process, without bending or distorting the corrugations.

It will be understood that the showing of the device is very diagrammatic and that the invention is capable of many refinements which will readily occur to those skilled in the art. For example, while the method described is particularly suited for the fabrication of corrugated board, other materials and means to suitably adapt these materials may be provided.

I claim:
1. In a machine for producing a continuous length of corrugated material, a solid, rigid, elongated gathering bed having a laterally flat-surfaced section at its end followed by a longitudinally curved-surface section, said curved-surface section decreasing in width in the forward direction for a portion thereof to a section of constant width for the remainder of its length, said curved-surface section being provided with a plurality of longitudinal flutes converging forwardly on an initial portion of said curved surface to a following portion whereon the flutes are parallel, the amplitude of the flutes in the converging portion becoming progressively greater and the period of the flutes in said converging portion becoming progressively smaller, the amplitude and period of the flutes thereafter remaining at a uniform constant in the parallel-fluted portion.

References Cited

UNITED STATES PATENTS

| | | | |
|---|---|---|---|
| 654,884 | 7/1900 | Ferres | 156—462 |
| 2,406,051 | 8/1946 | Weiss | 156—462 |
| 2,494,431 | 1/1950 | Eckstein | 156—594 |
| 2,710,043 | 6/1955 | Hubmeir | 156—594 |
| 739,276 | 9/1903 | Allen | 156—589 |
| 2,163,063 | 6/1939 | Romanoff | 156—592 |
| 2,236,932 | 4/1941 | Arentsen | 154—594 XR |
| 2,876,824 | 3/1959 | West et al. | 156—342 |

FOREIGN PATENTS 583,894  8/1933  Germany.

EARL M. BERGERT, *Primary Examiner.*

M. L. KATZ, *Assistant Examiner.*

U.S. Cl. X.R.

156—594; 264—286